May 2, 1950      W. H. HANNES      2,506,548

POWER TRANSMISSION DEVICE

Filed April 1, 1947

INVENTOR.
WILBERT H. HANNES

BY Jas. C. Hobensmith

ATTORNEY

Patented May 2, 1950

2,506,548

UNITED STATES PATENT OFFICE 2,506,548

POWER TRANSMISSION DEVICE

Wilbert H. Hannes, Willow Grove, Pa., assignor to Roxy Lawnshear Corporation, Elkins Park, Pa., a corporation of Pennsylvania Application April 1, 1947, Serial No. 738,518

2 Claims. (Cl. 74—242.15)

This invention relates to power transmission devices, particularly adaptable for use in power operated lawn mowers of the type in which the rotating cutting knives, or the traction wheels, or both, are driven by a suitable engine or motor.

In machines such as power operated lawn mowers, which usually get into the hands of people who are not particularly skilled along mechanical lines, considerable difficulty has been experienced in designing a satisfactory device for connecting and disconnecting the source of power to the driven shaft from which the cutter knives, and in some instances the traction wheels, are driven.

The principal object of the present invention is to provide improved means for transmitting the power of the engine or motor to a driven shaft in a structure such as a lawn mower, the device being constructed and arranged in such a manner as to permit the disconnection of the engine from the driven shaft, and also to serve as a belt tightener when the parts are in the operative positions.

A further object of the invention is to provide a device of the character aforesaid, which will function not only to cause the belt to be brought to the proper degree of tension when the parts are in their operative positions, but will also act in a manner similar to a friction clutch to permit the disconnection on the engine from the driven shaft, and the reconnection thereof smoothly and without jerk.

The nature and characteristic features of the invention will be more readily understood from the following description, taken in connection with the accompanying drawing forming part hereof, in which.

Figure 1:
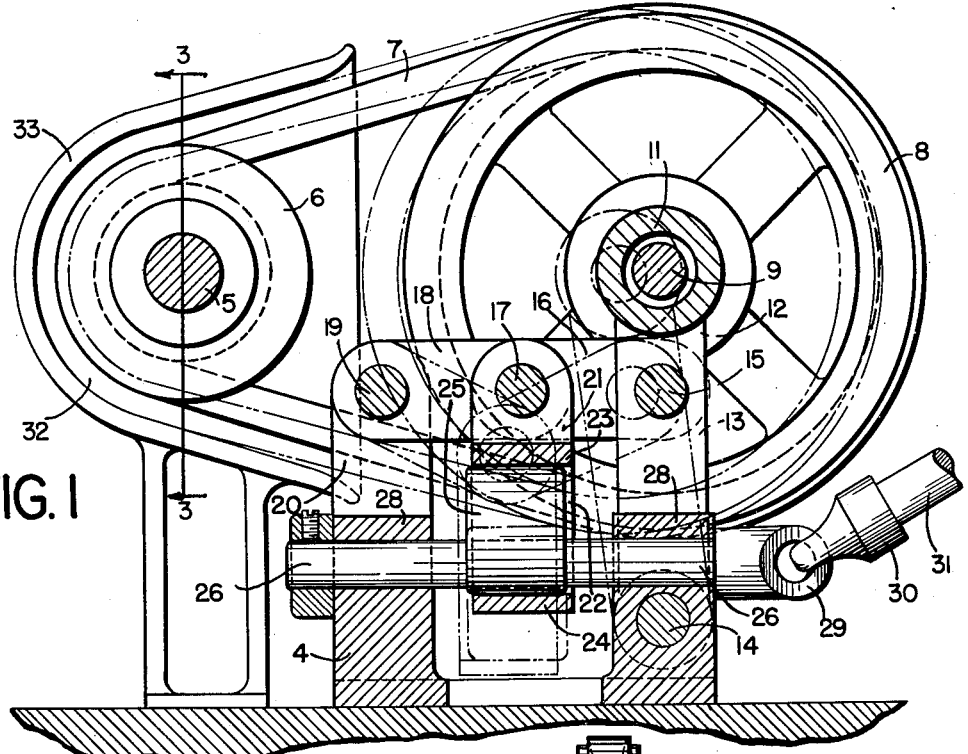
Figure 1 is a vertical central sectional view, taken approximately on the line I—I of Fig. 2, illustrating a power transmitting device embodying the main features of the present invention.
Figures 2, 3:
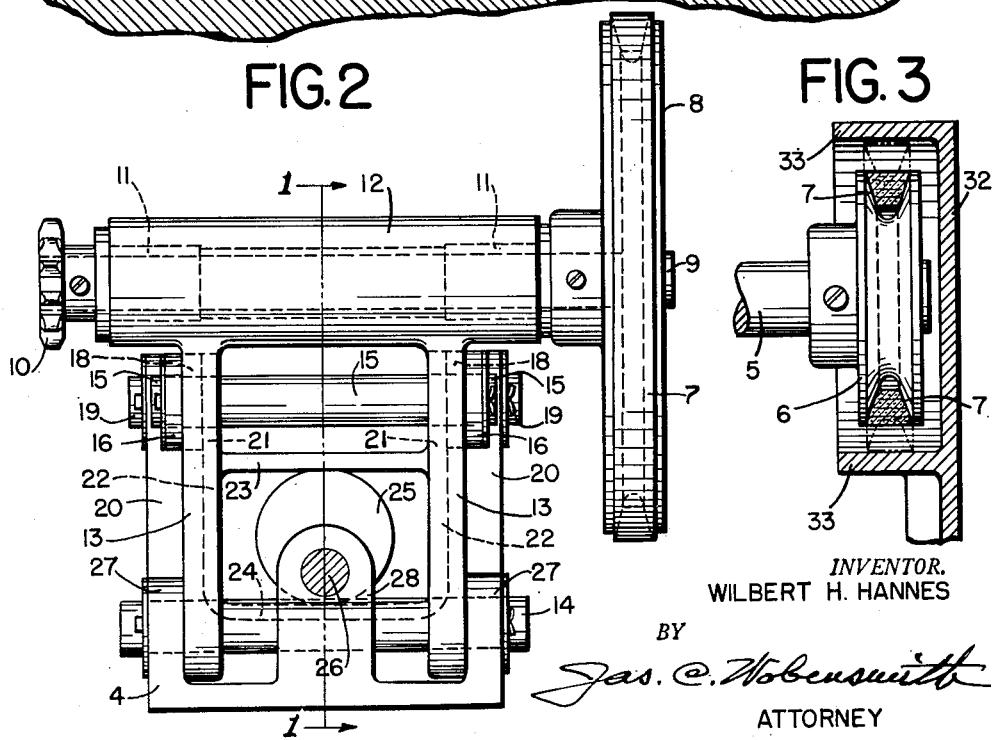
Fig. 2 is an end elevation thereof, the shaft for moving the parts to and from the operative positions being shown in section.
Fig. 3 is a section taken approximately on the line 3—3 of Fig. 1.

It should, of course, be understood that the description and drawing herein are illustrative merely, and that various modifications and changes may be made in the structure disclosed without departing from the spirit of the invention.

Referring to the drawing, in the particular embodiment of the invention therein shown, 5 is the driving shaft, which may be an extension of the main shaft of the engine or motor not shown. The shaft 5 has mounted thereon a drive pulley 6, preferably of the type adapted for operation with a V-belt. The belt 7 extends from the drive pulley 6 to a driven pulley 8, which is mounted on and secured to one end of shaft 9.

The shaft 9 carries a sprocket 10 at the end thereof remote from the pulley 8. The sprocket 10 is intended to drive the cutter blades and, in some instances, the traction wheels of the mower by means of a suitable chain not shown. The shaft 9 is journaled in suitable bushings 11, mounted in the upper ends of a pivoted frame 12. The frame 12 is provided with downwardly extending arms 13, the lower ends of which are pivotally mounted on a transverse pin 14, which extends through and is supported in portions 27 and 28 of the main frame work 4 of the device.

A pin 15 extends transversely through the upper portions 13 of the pivoted frame 12, between the shaft 9 and the pin 14. The pin 15 serves as a means of pivotal connection of links 16 to another transverse pin 17. The pin 17 is connected by links 18 to another transverse pin 19, which is mounted, on a fixedly located axis, in an upwardly extending portion 20 of the main frame work 4. The pins 15, 17 and 19 and the links 16 and 18 comprise a toggle arrangement which is so constructed and arranged as to retract the pivoted frame 12 on its pivot pin 14 when the pin 17, between the links 16 and 18, is lowered.

The central pin 17 of the toggle arrangement, above described, is mounted in the upper ends of arm portions 21 of a yoke member 22. The yoke member 22 has horizontally disposed portions 23 and 24 between which an eccentric 25 is mounted. The eccentric 25 is secured on a longitudinally extending stud shaft 26, which is journaled in portions 28 of the frame work, the arrangement being such that as the eccentric 25 is turned on the axis of the shaft 26, the central pivot 17 of the toggle arrangement will be raised and lowered, and when the eccentric is on the dead center, in either of the upper or lowermost positions, the yoke member 22 will be locked in such position and thereby the parts will be maintained and held in the connected or disconnected positions.

The forward end of the stud shaft 26 is provided with an eye member 29 engaged by a similar eye member 30 mounted on the lower end of the manually operable shaft or rod 31. The shaft or rod 31 extends to a suitable location for ready control and actuation by the operator to bring the parts to either connected or disconnected condition.

Partially surrounding the driving pulley 6 is a guide or shield member 32, which is shaped so as to form a guide and provide a support for the outer face of the belt 7 when the driven pulley 8 and the associated parts are brought to the disconnecting positions. When the parts are brought to such positions, the belt 7 will disengage itself from the driving pulley 6 and will be maintained in such disconnected position by the guide or shield member 32. The wall portion 33 of member 32 is so proportioned and shaped relatively to the guide pulley 6 as to maintain the belt 7, when the parts are in the disconnected positions, spaced at a substantially uniform distance from and around the pulley 6, serving to prevent the same from engaging said driving pulley 6, which will normally be running, until it is desired to rotate the driven shaft 9.

The operation of the device will now be readily understood. Initially, the parts are in the positions as indicated by dotted lines in Fig. 1 of the drawing. That is to say, the toggle links 16 and 18 are in angular positions so that the pivoted frame 12 is swung over with the driven shaft 9 in the position nearest the driving shaft 5. When the parts are in these positions, the belt 7 will be in the position as shown in dotted lines, with its outer face resting against the inner surface of the wall 33 of the guide or shield member 32. Even if the driving shaft 5 is rotating the belt will not be actuated, as the same will be held definitely out of engagement with the groove of the driving pulley 6.

It will be noted that when the parts are in the respective dotted line positions, the eccentric 25 on the stud shaft 26 will be in its lowermost dead center position and will lock the parts in the disengaged or idle positions and thereby prevent accidental rotation of the driven shaft 9.

However, when it is desired to bring the machine, in which the device is used, into operation, the rod 31 and the stud shaft 26 will be manually rotated a half revolution thereby to bring the eccentric 25 to its uppermost dead center position, thus raising the yoke 22, and causing the toggle links 16 and 18 to be brought to their distended horizontal positions, as shown in full lines in Fig. 1 of the drawing.

It will be noted that when the yoke 22 is brought to this position by the manual rotation of the rod 31 and the stud shaft 26, the parts will then be locked in their operative positions, thereby preventing accidental stoppage of the operating parts of the machine, such as a lawn mower or the like, in which the device is used.

It will, of course, be noted that when the toggle links 16 and 18 are brought to their distended horizontal positions, as shown in Fig. 1 of the drawing, the pivotally mounted frame 12 will thereby be swung to a position to bring the axis of the shaft 9 to the position most remote from the driving shaft 5, and when the parts are in these positions the belt 7 will be brought to the proper degree of tension and thereafter the shaft 9 will be continuously rotated by the engagement of the belt 7 with the driving pulley 6 and driven pulley 8.

I claim:

1. In a power transmission device comprising a driving pulley, a driven pulley, and a belt extending therebetween, the combination therewith of a frame one end of which is pivotally connected to a stationary portion of the structure and in the other end of which one of said pulleys is journaled, and means for moving said frame from one position to another thereby to slacken and tighten the belt, said means comprising toggle links having one end pivotally connected to the end of said frame in which one of said pulleys is journalled and having their other end pivotally connected with a stationary portion of the structure, a yoke connected to the intermediate pivot of said toggle links for actuating said toggle links, and manually operable means for actuating said yoke and for locking the parts in operative and inoperative positions respectively.

2. In a power transmission device comprising a driving pulley, a driven pulley, and a belt extending therebetween, the combination therewith of a frame one end of which is pivotally connected to a stationary portion of the structure and in the other end of which one of said pulleys is journaled, and means for moving said frame from one position to another thereby to slacken and tighten the belt, said means comprising toggle links having one end pivotally connected to the end of said frame in which one of said pulleys is journalled and having their other end pivotally connected with a stationary portion of the structure, a yoke connected to the intermediate pivot of said toggle links for actuating said toggle links, an eccentric for actuating said yoke and for locking the parts in operative and inoperative positions respectively, and manually operable means for rotating said eccentric.

WILBERT H. HANNES.

REFERENCES CITED

The following references are of record in the file of this patent:

UNITED STATES PATENTS

| Number | Name | Date |
|---|---|---|
| 1,482,370 | Spilger | Jan. 29, 1924 |
| 1,708,903 | Schroder | Apr. 9, 1929 |
| 1,799,261 | Stoody | Apr. 7, 1931 |
| 2,272,981 | Nelson | Feb. 10, 1942 |
| 2,433,709 | Rogers | Dec. 30, 1947 |